United States Patent
Durak et al.

(10) Patent No.: US 12,505,187 B2
(45) Date of Patent: Dec. 23, 2025

(54) METHOD, A SYSTEM AND A BIOMETRIC SERVER FOR CONTROLLING ACCESS OF USERS TO DESKTOPS IN AN ORGANIZATION

(71) Applicant: GLOBAL ID SA, Lausanne (CH)

(72) Inventors: Betül Durak, Pittsburgh, PA (US); Loïs Huguenin-Dumittan, Neuchâtel (CH); Lambert Sonna Momo, Romont (CH); Serge Vaudenay, Crissier (CH)

(73) Assignee: Global ID SA, Lausanne (CH)

( * ) Notice: Subject to any disclaimer, the term of this patent is extended or adjusted under 35 U.S.C. 154(b) by 209 days.

(21) Appl. No.: 17/797,340

(22) PCT Filed: Feb. 2, 2021

(86) PCT No.: PCT/IB2021/050835
§ 371 (c)(1),
(2) Date: Aug. 3, 2022

(87) PCT Pub. No.: WO2021/156746
PCT Pub. Date: Aug. 12, 2021

(65) Prior Publication Data
US 2023/0084042 A1    Mar. 16, 2023

(30) Foreign Application Priority Data
Feb. 3, 2020    (CH) .................................... 00121/20

(51) Int. Cl.
*G06F 21/32*    (2013.01)
*G06F 21/62*    (2013.01)

(52) U.S. Cl.
CPC .......... *G06F 21/32* (2013.01); *G06F 21/6218* (2013.01)

(58) Field of Classification Search
CPC ..... G06F 21/32; G06F 21/6218; G06V 40/14; G06V 40/1318; G06V 40/1341;
(Continued)

(56) References Cited

U.S. PATENT DOCUMENTS

2012/0159599 A1* 6/2012 Szoke ..................... G06F 21/35
726/7
2014/0337634 A1    11/2014 Starner
(Continued)

FOREIGN PATENT DOCUMENTS

CN         109190554 A  *  1/2019
WO         WO-90/08366 A1    7/1990
(Continued)

OTHER PUBLICATIONS

English translation of CN-109190554-A (Year: 2019).*
(Continued)

*Primary Examiner* — Brian Whipple
(74) *Attorney, Agent, or Firm* — Blank Rome LLP (57) ABSTRACT

A method for controlling access of users to desktops, comprising: 1. a user enters a login; 2. an organization server verifies if the user is authorized to access the desktop, and returns a pseudo of the user; 3. the user scans a pattern of fingerveins of one finger with a biometric scanner comprising cameras at different angles; 4. a file corresponding to said images is encrypted by said biometric scanner (B) with a public key of a biometric server and signed with a private key of said biometric scanner, and sent to the desktop; 5. the desktop forwards said file to said biometric server; 6. the biometric server decrypts the file, verifies the signature of the biometric scanner, and matches the received images with reference images associated with said pseudo; 7. the biometric server decides if the recognition succeeded, failed, or if an additional scan is needed.

14 Claims, 2 Drawing Sheets

(58) Field of Classification Search
CPC .... G06V 40/1365; G06V 40/70; A61B 5/117; H04L 9/3231; H04L 9/3247; H04L 63/0861
See application file for complete search history.

(56) References Cited

U.S. PATENT DOCUMENTS

| | | | |
|---|---|---|---|
| 2015/0067827 A1* | 3/2015 | Lim .................. | G06F 21/32 726/19 |
| 2019/0028468 A1 | 1/2019 | Garcia | |
| 2022/0270723 A1* | 8/2022 | Schneider ............ | G16H 40/67 |

FOREIGN PATENT DOCUMENTS

| | | | | |
|---|---|---|---|---|
| WO | WO-01/22351 A1 | 3/2001 | | |
| WO | WO-2018164363 A1 * | 9/2018 | ............ | G06F 21/32 |

OTHER PUBLICATIONS

International Search Report and Written Opinion for PCT/IB2021/050835, dated Mar. 16, 2021, 11 pgs.
P. Junod, "On the Optimality of Linear, Differentail, and Sequential Distinguishers", EUROCRYPT 2003, LNCS 2656, pp. 17-32.

* cited by examiner

METHOD, A SYSTEM AND A BIOMETRIC SERVER FOR CONTROLLING ACCESS OF USERS TO DESKTOPS IN AN ORGANIZATION

RELATED APPLICATION

The present application claims priority of Swiss Patent application CH00121/20, the contents of which is hereby incorporated by reference.

FIELD OF THE INVENTION

The present invention concerns a method allowing organizations to have secure strong access control of their users to their desktops based on biometry.

DESCRIPTION OF RELATED ART

Access control (AC) systems perform identification authentication and authorization of users in an network by evaluating login credentials that can include passwords, personal identification numbers (PINs), biometric scans, security tokens or other authentication factors. These systems work by identifying a user, verifying that the user is who he claims to be, and authorizing the access level associated with the user.

Many organizations rely on directory services, including the Local Directory Access Protocol (LDAP) and the Security Assertion Markup Language (SAML), to provide access control for authenticating and authorizing users and enabling them to connect to desktops and other network resources, such as servers or distributed applications. In most organizations, access control relies on one single authentication factor, very often a user identification and password combination. The level of security offered is relatively low as passwords are notoriously easy to guess.

Biometric access control provides another mechanism to authenticate users. Several secure and privacy-preserving biometric protocols have been proposed with different techniques.

Multifactor authentication, which requires two or more authentication factors, is also known in access control systems. They usually require a dedicated authentication server in which the identity and biometric references of the authorized users are stored. Those solutions are therefore difficult to deploy in organizations which already use an organization server for access control, since this organization server needs to be replaced or updated which is a difficult and risky process. Moreover, saving biometric references of the user in an organization server, and transmitting them through the organization network, often creates privacy issues.

BRIEF SUMMARY OF THE INVENTION

An aim of the invention is to add a multimodal access control (AC) to an existing password-based access control system deployed between a desktop and a directory server.

An aim is to propose an access control method and system that is easy to deploy on already existing access control systems, for example in organizations where desktop access control is based on an organization directory server such as a LDAP server for example.

Another aim is to propose a multimodal access control method and system which respects the privacy of the users' biometric credentials.

According to the invention, these aims are achieved with a method for controlling access of users to desktops in an organization, comprising steps where:

1. a user requests access in a desktop, possibly by entering a login and possibly a password;
2. an organization server verifies if the user is authorized to access the desktop, and returns a pseudo of the user;
3. the user scans a pattern of fingerveins of one finger with a biometric scanner comprising a plurality of cameras at different angle around the finger, resulting in a plurality of images of said pattern;
4. a file corresponding to said images is encrypted by said biometric scanner with a public key of a biometric server and signed with a private key of said biometric scanner and sent to the desktop;
5. the desktop forwards said encrypted and signed file to said biometric server;
6. the biometric server decrypts the received file with its private key, verifies the signature of the biometric scanner, and matches the received images with reference images associated with said pseudo;
7. the biometric server decides based on the result of this match if the recognition succeeded, failed, or if an additional scan of the user's finger is needed.

The method thus provides a strong access control (AC) using end-to-end encryption and fingervein recognition.

The method thus separates biometric data from identity information.

In one embodiment, the biometric templates are only accessible to the biometric scanner and to the biometric server.

In one embodiment, the claimed identity of the user is only accessible to the desktop and to the organization server.

In one embodiment, the biometric server compares images of the same finger from different angles with reference images of the same finger corresponding to the claimed pseudo and delivers several matching scores which are aggregated before a decision to grant or refuse access is taken. The reliability is thus improved since the number of identifying features is higher when more images are taken. Furthermore, the capture of the pattern of veins from different angles is a protection against the risk of spoofing with a 2D representation of one fingervein pattern.

The above-mentioned steps 3-7 of scanning, transmitting, decrypting and matching are preferably iteratively repeated until a predefined false acceptance rate and/or false rejection rate is achieved.

The number of iterations that is needed may be approximated based on a method of sequential distinguishers.

The invention is also related to a control access system for controlling access of users to desktops in an organization, comprising:

1. a plurality of desktops in which a user can enter a login;
2. an organization server arranged for verifying if the user is authorized to access the desktop, and for returning a pseudo of the user;
3. a biometric scanner arranged for letting the user scan a pattern of fingerveins of one finger, said biometric scanner comprising a plurality of cameras at different angle around the finger, resulting in a plurality of images of said pattern, said biometric scanner further comprising a processing system arranged for encrypting a file corresponding to said images with a public key of a biometric server, for scanning said file with a private key of said biometric scanner, and for sending the encrypted and signed file to one said desktop;

4. a biometric server distinct from said organization server;
5. said desktop being further arranged for forwarding said encrypted and signed file to said biometric server;
6. said biometric server being further arranged for decrypting the received file with its private key, for verifying the signature of the biometric scanner, and for matching the received images in said file with reference images associated with said pseudo;
7. the biometric server being further arranged for deciding based on the result of this match if the recognition succeeded, failed, or if an additional scan is needed.

The invention is further related to a biometric server arranged for receiving a file, for decrypting the received file with a private key, for verifying the signature of the file, and for matching received images in said file with reference images of a user identified by a pseudo;

the biometric server being further arranged for deciding based on the result of this match if the recognition succeeded, failed, or if an additional scan of the user's finger is needed.

The biometric authentication method can be integrated into an already existing weakly private authentication system such as password-based systems.

BRIEF DESCRIPTION OF THE DRAWINGS

The invention will be better understood with the aid of the description of an embodiment given by way of example and illustrated by the figures, in which.

DETAILED DESCRIPTION OF POSSIBLE EMBODIMENTS OF THE INVENTION

Notations

We use following notations and abbreviations in the text:

⊥ denotes an error message or a dummy value (e.g. a null pointer, an empty string, or an empty list).

PKC Public-key cryptosystem. Given a cryptographic key pair (pk, sk), PKC encrypts a plaintext pt into a ciphertext ct using pk and decrypts it back using sk DSS Digital signature scheme. Given a key pair (vk, sk), DSS signs data data using sk and verify the signature using vk AEAD Authenticated encryption with associated data. Given a key K∈AEAD.K, AEAD encrypts a plaintext pt with associated data ad and a nonce N∈AEAD.N and decrypts it back with the same K.

H Hash function. Given a bitstring x, H computes a digest with H(x).

Dec Deterministic function.

Typically, PKC provides INDCCA security, DSS is EFCMA-secure, AEAD is secure as a MAC and as an encryption against chosen plaintext/ciphertext attacks, and we consider a collision-resistant hash function H. These primitives work with the following notations:

PKC.Gen→(pk.sk)   PKC.Enc$_{pk}$(pt)→ct   PKC.Dec$_{sk}$(ct)→pt

DSS.Gen→ (vk.sk) DSS.Sign$_{sk}$(data)→σ DSS.Verify$_{vk}$ (data.σ)→0/1

AEAD.Enc$_K$(N,ad,pt)→ct   AEAD.Dec$_K$(N.ad.ct)→pt

Example of Embodiment

In this description, we focus on an organization which has its own network and file system. Many organizations offer a system to authenticate its users with passwords, such as Active Directory implemented with LDAP-like protocol for example.

More specifically, the following embodiment is related to users aiming to log in desktops/laptops D under a network in such an organization using a biometric scanner B. In such an organization, an organization server L is used for verifying if a user requesting access is authorized to access his machine and/or the network. In one example, the organization server authenticates the user with a login and password entered by the user. The organization server may also identify the user and verifies if he belongs to a group of authorized users. The organization server L may include a directory, such as for example a LDAP directory, to authenticate or identify the users through passwords. In the present invention, to add an extra layer of secure authentication, a biometric server S which is responsible for the biometric recognition is introduced.

Figure 1:
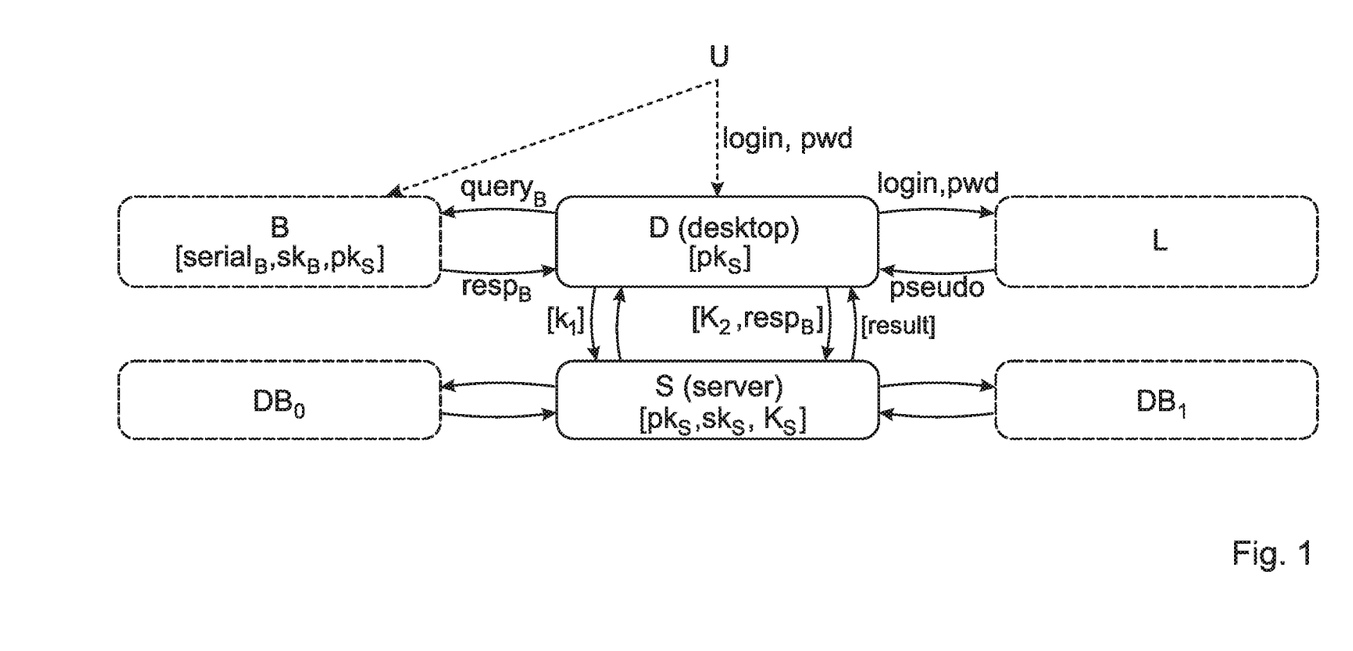
FIG. 1 shows a view of an access control system according to the invention.

A high-level overview of the system is given in FIG. 1. Solid rectangles are the machines whereas dashed rectangles are the databases on the corresponding machines. Dashed arrow indicates the inputs from the user to the specified machines. Solid arrows indicate the exchanges between the machines over the network.

The method is based on a system with different entities, including machines, databases, and human users:

User: U: a person who wants to access a desktop and a network, and which can be authenticated and authorized for example with a login, password pwd, and fingervein. The fingervein is unique for each user and corresponds to a set of images of the 3D pattern or blood vessels in one finger of the user, or to features extracted from such images.

Biometric scanner: B. Biometric scanners capture biometric information of users and do necessary computations by following the protocol honestly. The biometric scanner takes several, for example threes images of a user's finger from different angles, which we call 3D fingervein or simply fingervein. Each biometric scanner has a unique identifier serial$_B$, a private cryptographic key sk$_B$ and knows the public cryptographic key pk$_S$ of the associated biometric server S.

Organization server: L. This server may belong to the organization and contains a database with a directory of its users, their names (login) and passwords (pwd). In one embodiment, the organization server may be based on Microsoft Active Directory. The organization server assigns a pseudo to some users, for privacy reasons. The pseudo is not required to be remembered (or even known) by the user. The organization server L has a unique identifier serial$_L$. A user name login is assumed to be unique to each L, meaning that the (serial$_L$, login) pair is unique.

Desktops: D. The desktop computers can connect to the information network of the organization. In this document, the expression "desktop" should not be limited to computers with a desktop form factor, but also includes laptop computers, all-in-one computers, tablets, smartphones, and any similar user equipment that can access the network of the organization once authenticated and authorized by the organization server.

In order to control access of users to desktops, each desktop is set up with the address of its organization server L and the address addr$_B$ of a close-by biometric scanner B.

Each desktop knows the public cryptographic key $pk_S$ of the associated biometric server S.

Enrollment station: E. (Not shown on FIG. 1) It consists of a computer, tablet or similar equipment used to enroll users with their biometric templates scanned through a biometric scanner B. The enrolment station E communicates with the biometric scanner B to capture biometric templates, i.e., and communicates with the biometric server S to add, remove, or modify entries in the database on the server.

Biometric server: S. In one embodiment, there is only one biometric server. It contains or can access two databases $DB_0$ and $DB_1$: $DB_0$ other stores identifiers of the enrollment stations and biometric scanners and $DB_1$ stores the reference biometric templates (ref temp) of users along with their associated pseudo (pseudo). The biometric server is used for matching the reference templates to the claimed users. The database $DB_0$ is used during the authentication of data coming through a legitimate enrollment station E and a legitimate biometric scanner B. The biometric server S can be outside of the organization's network. One biometric server can be shared by different organizations.

Setup

A list of parameters that each element of the system holds is indicated in Table 1.

TABLE 1

| D | B | L | E | S |
|---|---|---|---|---|
| $pk_S$ | $pk_S$ | | $pk_S$ | $(pk_S, sk_S)$ |
| $serial_L$ | $(vk_B, sk_B)$ | | $(vk_E, sk_E)$ | $K_S$ |
| $addr_B$ | $serial_B$ | $serial_L$ | $serial_E$ | |
| | | DB = {(login, pwd, pseudo)} | | $DB_0$ = {(serial, vk)} $DB_1$ = (pseudo, finger, ref-temp, policy)} |

More specifically, the biometric server S generates or stores its PKC key pair $(pk_S, sk_S)$ and a symmetric key $K_S$ $\in$ AEAD.K. Each biometric scanner B is configured with its own DSS key pair $(vk_B, sk_B)$ and a unique serial number $serial_B$. It keeps a copy of $pk_S$, as well.

Each enrollment station E is configured with its own DSS key pair $(vk_E, sk_E)$ and a unique serial number $serial_E$. It stores $pk_S$, as well. The biometric server S maintains a directory $DB_0$ of the public keys vk ($vk_B$ or $vk_E$) of each B and E by their serial numbers ($serial_B$ or $serial_E$). The biometric server S holds one database DB1 of (pseudo, finger, ref-temp, policy) and (pseudo, policy) entries which is populated by the enrollment station.

Each desktop D may hold the public key $pk_S$ of the biometric server S. The organization server L holds a database of (login, pwd, pseudo) entries for first layer authentication with passwords.

One organization may consist of many departments. We identify each department with "domain" which is referred by a unique string domain. The organization server L is unique for each domain, that is L stores users data for this specific domain. We assume that each pseudo is unique. The biometric server S is unique (cross-domain). We assume a secure communication between D and L. We further assume that the password-based protocol between D and L is secure by default.

As depicted in FIG. 1, D serves as an intermediate machine between the biometric scanner B and the biometric server S to make them communicate. The method of the invention uses this "intermediary" in a secure way by encrypting the exchange of messages sent by the biometric scanner B to the biometric server S, using the public key $pk_S$, and by mutually authenticating these two entities when they communicate.

An aim of the invention is to add strong access control to an existing password-based access control system deployed between D and L.

An aim is to add no software on the directory server L and to make as little changes as possible on the desktops D.

For privacy reasons, nobody but the biometric scanners B and the biometric server S need to see biometric templates (biometric test and reference images).

Nobody but the organization server L and the desktops D see the identity of the user. Hence, we only allow the biometric server S to associate biometric data to a pseudo.

Nobody but L, D, and S see the pseudo of the user. Therefore, unless there is any collusion, the method offers strong privacy by design, and no one can associate biometric templates with a user.

We make sure that the server S will only treat information coming from a legitimate biometric scanner. The desktops D only forwards messages and does one encryption for S. Hence, the overhead on the desktop D is minimal. This makes the protocol feasible to deploy on already existing systems.

In this specific embodiment, the user authentication is based on fingervein biometry. To defeat spoofing attacks, it uses what we call 3D fingervein by capturing fingervein through several angles.

Figure 2:
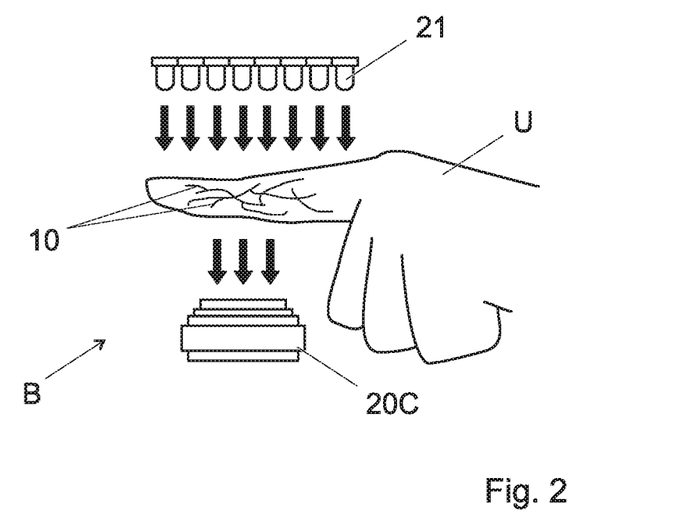
FIG. 2 is a side view of a biometric scanner for capturing a fingervein of a user.
Figure 3:
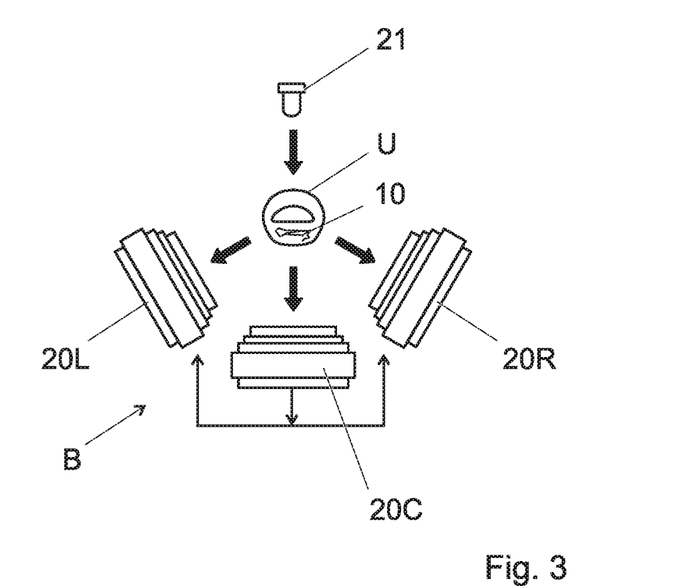
FIG. 3 is a front view of a biometric scanner for capturing a fingervein of a user.

An example of biometric scanner B for capturing fingervein is shown in FIGS. 2 and 3. It comprises a light source, such as LEDs, on one side of a finger of the user U, and three cameras 20L, 20C, 20R for capturing images of the blood vessels 10 in the finger, from three different angles.

The scanning of the finger may use infrared lights and several, in this example three, cameras 20L, 20C, 20R placed with different angles for capturing images of the blood vessels 10 in the finger, from several different angles. The scanning happens when the user U inserts her finger in a hole where the top is filled with a rack of infrared LEDs 21 and the bottom has the cameras 20. The scanner may interact with its user through color LEDs and/or a small display. The infrared LEDs illuminate a finger and three cameras take images, such as QVGA images, of the finger from three different angles.

When prompted to scan a finger, the biometric scanner B waits until a presence sensor detects a finger. As each LED corresponds to a region of the picture, we dynamically adjust by software the power of each LED so that the histogram of the corresponding region is optimal. Then, the cameras take a picture. Images may be in gray-scale of size 320×240. They are stored in png format with a file size of one image being around 70 KB in total.

The biometric scanner B (FIG. 2) comprises a processing system, such as a microprocessor, a microcontroller, or an embedded computer, such as a Raspberry Pi, for controlling the illumination and capture, processing the images captured by the several cameras, extracting features from each image, and sending the features (what we call the fingervein) of each image to the desktop D. The fingervein sent to the desktop D is encrypted with the public key $pk_S$ of the biometric server S and signed with the private key $sk_B$ of the biometric scanner B.

The communication with the biometric scanner B may happen through Ethernet, USB or WiFi for example.

The biometric scanner B further comprises a processing system, such as a microprocessor or microcontroller or embedded computer, for controlling the illumination and capture, processing the images captured by the three cameras, extracting features from each image, and sending the features (what we call the fingervein) of each image to the desktop D. The fingervein sent to the desktop D is encrypted with the public key $pk_S$ of the biometric server S and signed with the private key $sk_S$ of the biometric scanner B.

The desktop D forwards the encrypted fingervein to the biometric server S, which decrypts it with its private key and verifies the signature of the biometric scanner.

The biometric server S then runs a matching algorithm with the features extracted from the several images of the finger from different angles, and compares those features with reference features of the claimed user obtained during enrolment. Since several pairs of images are compared, the process delivers several matching scores, for example three.

According to one aspect, those different matching scores are aggregated before a decision to grant or refuse access is taken.

The aggregation of matching scores has been developed in order to reach a desired FAR and FRR. FAR is the false acceptance rate, i.e. the probability that a wrong finger is accepted, FRR is the false rejection rate, i.e. the probability that the right finger is rejected.

To do this, the invention uses the method of sequential distinguishers. At every capture, the algorithm decides if the recognition succeeded, failed, or requires more biometric samples to conclude. Hence, a user may be required to be scanned several times, although in most cases, one capture is enough.

Access Control Protocols

For this section, we start defining a (straightforward) prior Access Control AC with login credentials and then continue with an example of extended AC method according to the invention.

More precisely, the prior access control method AC works as follows.

1. The user types his identifier login and his password pwd on a desktop D.
2. The desktop D queries the organization server L with queryL=(login, pwd) and gets the response respL. Then, the organization server L computes the response by respL=pseudo, where (login, pwd, pseudo) is a valid record in the database. Otherwise, respL=⊥.
3. If the response by L is ⊥, access is denied and the protocol ends. Otherwise, the desktop D proceeds with the step of extended access control.

The extended access control AC of the invention depends on the biometric matching. That is, upon inviting the user U to the biometric scanner B to provide a fingervein (test biometric features extracted from the images captured with the scanner), the fingervein will be matched with the reference fingervein of the claimed user, as stored in the database $DB_1$ during enrollment.

The matching algorithm returns a score which may be insufficient to decide to accept or reject. The decision can be to ask for another scan. The final decision is based on all collected scan. Therefore, the extended AC works in a succession of iterations which are defined by a capture step. The capture step can include a prompt for the capture of the fingervein of one specific finger. Some special steps are used to terminate the iteration cycle: a step which accepts and a step which rejects the authentication attempt.

TABLE 2

| | |
|---|---|
| $finger_{l,n}$ | Represents a set l of fingers to be scanned n times. The access is granted conditioned that the user's corresponding finger matches with the reference template stored in the database. The step may include a display of a message on the scanner. |
| "always" | The desktop D always grants access. |
| "never" | The desktop D always denies access. |
| "sms" | A verification code is sent by short message, for example SMS, to the user who types it on D. |
| "security" | An alert is sent to the security officer who may call the user. |

In Table 2, we give a list of steps for the extended authentication control along with their descriptions. We define both the step of the first iteration and then the algorithm to decide on the next step based on the collected results (i.e. aggregated scores). These two elements form the policy: policy.initmethod and policy.method. More precisely, the initial step to be used is policy.initmethod and after having collected a list hist of scores, the next step is policy.method(hist). If hist is enough, we have policy.method(hist)="always" (access granted) or policy.method(hist)="never" (access denied). The step could repeatedly be finger{i},1 (meaning to scan finger i once), change fingers, or try other modalities. We specify the policy for each user at enrollment, as one record of DB1.

We will now describe three stages of the extended authentication control of the invention.

The first iteration of the extended access control AC starts with a protocol called "Stage 1" with the biometric server S who sets the initial step (line 4-6 on the right in the diagram for stage 1). Then, it goes through a protocol called "Stage 2" using step (line 2-8 on the left and line 7 on the left in the diagram of stage 2).

Desktop D (Stage 1)

input: pseudo, $addr_B$, $serial_B$
stored: $pk_S$
1: $K_1 \leftarrow_\$ AEAD.\mathcal{K}$
2: $query_S \leftarrow PKC.Enc_{pk_S}$ ("Request", $K_1$, pseudo, $serial_B$)
3: send $query_S$ to S
4: get $resp_S$
5: parse $resp_S = [N_{12}, ct_1]$
6: $(token_S, K) \leftarrow AEAD.Dec_{K_1}(N_{12}, \bot, ct_1)$
7: erase $K_1$
8: continue to Stage 2

Biometric server S ("Request query")
stored: $sk_S$, $K_S$

1: receive $query_S$
2: if anything fails below then return $resp_S = \bot$
3: $PKC.Dec_{sk_S}(query_S) \rightarrow$ ("Request", $K_1$, pseudo, $serial_B$)
4: retrieve policy with psuedo from $DB_1$
5: hist $\leftarrow \bot$
6: method $\leftarrow$ policy.method(hist)
7: set T as current time
8: ad $\leftarrow$ method
9: $K \xleftarrow{\$} AEAD.\mathcal{K}$
10: pt $\leftarrow$ (T, pseudo, hist, $serial_B$, K)
11: $N_{11}, N_{12} \leftarrow \$ AEAD.\mathcal{N}$
12: $token_S \leftarrow [N_{11}, ad, AEAD.Enc_{K_S}(N_{11}, ad, pt)]$
13: $resp_S \leftarrow [N_{12}, AEAD.Enc_{K_1}(N_{12}, \bot, token_S, K)]$
14: return $resp_S$ Access control stage 1 (between D and S)

Access Control Stage 1 (Between D and S)

---

Access control stage 2 (between D and B)

---

Desktop D (Stage 2)
1: parse $token_S = [N_{11}, ad, ct_2]$
2: parse ad = method
3: if method $\in$ {"sms","securitas"} then
4:   method ← treat (method, hist, $serial_B$, login, host)
5: end if
6: if method = "always" then grant access
7: if method = "never" then deny access
8: if method is not biometric then abort
9: display "scan finger in scanner $serial_B$"
10: $query_B$ ← ($serial_B$.$token_S$)

11: send $query_B$ to B at $addr_B$
12: get $resp_B$
13: continue to Stage 3

Biometric scanner B
stored: $sk_B$, $pk_S$, $serial_B$
1: receive $query_B$
2: if anything fails below then return $resp_B = \perp$
3: parse $query_B$ = ($serial_B$, token)
4: check that $serial_B$ is correct
5: parse token = [N, ad, ct]
6: parse ad = method
7: parse method = ($finger_{I,n}$, message)
8: display message
9: extract I, n from $finger_{I,n}$
10: for i $\in$ I. j = 1, ..., n do
11:   invite $finger_i$
12:   capture $temp_{i,j}$ 13: end for
14: temp ← list of all ($finger_i$, $temp_{i,j}$)
15: $data_0$ ← ($query_B$, temp)
16: $sign_0$ ← DSS.$Sign_{sk_B}$ ($data_0$)
17: $resp_B$ ← PKC.$Enc_{pk_S}$ ($data_0$, $sign_0$)
18: return $resp_B$

---

Access Control Stage 2 (Between D and B)

In Stage 2, the desktop D may decide to end (by granting access or denying access) or interact with the biometric scanner B After that, it goes through a protocol with the biometric server S called "Stage 3". In this stage, we determine the next step to use (line 24 in the following diagram).

Access control Stage 3 (between D and S)

---

Desktop D (Stage 3)
1: $K_2$ ← sAEAD.$\mathcal{K}$
2: $query_S$ ← PKC.$Enc_{pk_S}$("Match", $K_2$, K)
3: send $query_S$ and $resp_B$ to S
4: get $resp_S$
5: parse $resp_S$ ← ($N_{12}$, $ct_2$)
6: (token, K) ← AEAD.$Dec_{K_2}$ (N, H($query_B$), $ct_2$)
7: erase $K_2$
8: continue to Stage 2

Biometric server S ("Match" query)
stored: $sk_S$, $K_S$
1: receive $query_S$ and $resp_B$
2: if anything fails below then return $resp_S = \perp$
3: parse ("Match", $K_2$, $\bar{K}$) = PKC.$Dec_{sk_S}$ ($query_S$)
4: (data, sign) ← PKC.$Dec_{sk_S}$ ($resp_B$)
5: parse data as ($query_B$, temp)

6: parse queryB as ($serial_B$, $token_S$)
7: retrieve $vk_B$ form $DB_0$ with $serial_B$
8: DSS.$Verify_{vk_B}$ (data, sign)
9: parse $token_S$ as (N, ad, ct)
10: pt ← AEAD.$Dec_{K_S}$ (N, ad, ct)
11: parse ad = $finger_{I,n}$
12: parse pt = (T, pseudo, hist.$serial_B$, K)
13: check K = $\bar{K}$
14: check $serial_B$ is correct
15: verify T not too early/late
16: x ← $\perp$
17: for all ($finger_i$, $temp_{i,j}$) $\in$ temp do
18:   retrieve ref-$temp_i$ from $DB_1$ with (pseudo, $finger_i$)
19:   compute score with the matching algorithm
20:   x ← (x, (i, score))
21: end for 22: hist' ← (hist, x)
23: retrieve policy from $DB_1$ with pseudo
24: determine method = policy.method(hist')
25: set T' as current time
26: ad ← method
27: K' $\overset{\$}{\leftarrow}$ AEAD.$\mathcal{K}$
28: pt ← (T', psuedo, hist', $serial_B$, K')
29: $N_{11}$, $N_{12}$ ←$_\$$ AEAD.$\mathcal{N}$
30: $token'_S$ ← [$N_{11}$, ad, AEAD.$Enc_{K_S}$($N_{11}$, ad, pt)]
31: $resp_S$ ← ($N_{12}$, AEAD.$Enc_{K_2}$($N_{12}$, H($query_B$), $token'_S$, K'))
32: return $resp_S$

---

Then, the method goes back to Stage 2. Note that whenever there is a failure in verification in a protocol, the protocol aborts immediately. Otherwise, the protocol continues.

The biometric scanner B is a stateless device. When it receives a request, it takes pictures, sends its response, then sleeps back.

As the biometric server S is stateless as well, the state information is carried inside a token that the biometric server S encrypts for himself. The token works like a cookie in a browser: the biometric S gives token in the response to the desktop D and D must provide it in the next query to the biometric server S. The token also contains the step to be performed in clear and which can be parsed by the desktop D and by the biometric server B.

Enrollment Protocol

The enrollment protocol is given in the following table:

```
                Enrollment station on device E
                input: pseudo, policy, addr_B, serial_B
                stored: skE, pks, serialE
                Stage 1:
    1:          set T as current time
    2:          K_0 ←_$ AEAD.K, N,←^cte AEAD.N
    3:          finger_{l,n} ← policy.initmethod
    4:          ad ← finger_{l,n}
    5:          pt ←
    6:          token_E ← [N, ad, AEAD. Enc_{K_0} (N, ad, pt)]
    7:          query_B ← (serial_B, token_E)

8: send query_B to B at addr_B --------→ ┌─────┐
    9: get resp_B ←------------------------- │  B  │
                                             └─────┘

Stage 2:
    10:         data_1 ← ("Enroll", K_0, serial_E, H (query_B), resp_B)
    11:         sign_1 ← DSS.Sign_{skE} (data_1)
    12:         query_S ← PKC.Enc_{pks} (data_1, sign_1)

13:         send query_S to S
    14:         get resp_S
    15:         parse resp_S = [N', ct']
    16:         check "ok" = AEAD, Dec_{K_0} (N', ⊥, ct')
    17:         erase K_0

Biometric server S ("Enroll" query) stored: sk_S
    18:         receive query_S
    19:         if anything fails below then return resps = ⊥
    20:         (data_1, sign_1) ← PKC. Dec_{sk_S} (query_S)
    21:         parse data_1 = ("Enroll", K_0, serial_E, h, resp_B)
    22:         retrieve vk_E from DB_0 with serial_E
    23:         DSS.Verify_{vk_E} (data_1, sign_1)
    24:         (data_0, sign_0) ← PKC.Dec_{sk_S} (resp_B)
    25:         parse data_0 = (query_B, temp)
    26:         check h = H (query_B)
    27:         parse query_B = (serial_B, token_E)
    28:         retrieve vk_B from DB_0 with serial_B
    29:         parse token_E = N', ad, ct)
    30:         pt ← AEAD, Dec_{K_0} (N', ad, ct)
    31:         parse ad = finger_{l,n}
    32:         parse pt = (T.pseudo, policy)
    33:         verify T not too early/late
    34:         DSS.Verify_{vk_B} (data_0, sign_0)
    35:         store (pseudo, policy) in DB_1
    36:         parse temp = (finger_i, temp_{i,j})_{i∈I,j=1,...,74}
    37:         for each i ∈ I do
    38:             decide which j defines ref-temp_i = temp_{i,j}
    39:             store (pseudo, finger_i, ref-temp_i) in DB_1
    40:         end for
    41:         pick N' ∈ N
    42:         resp_S ← [N',AEAD. Enc_{K_0} (N', ⊥, "ok")]
    43:         return resp_S
```

Enrolment protocol. The dashed square represents the steps run by the biometric scanner B as in access control stage 2.

Enrolment Protocol. The Dashed Square Represents the Steps Run by the Biometric Scanner B as in Access Control Stage 2.

The input to the enrollment protocol (on E) is a string pseudo associated to a user to register, and the address addrB of the scanner B. The enrollment could be done remotely: E and B need not be close to each other if the identity of the scanned user can be trusted. Specifically, E goes through two stages: Stage 1 with B and Stage 2 with S. In Stage 2, S receives a query of type "Enroll". Both stages are defined in FIG. 7. In communication with B, only serialB, N, and ad=step are in clear. All the rest is end-to-end encrypted.

Both the biometric server S and the biometric scanner B are stateless (both in enrollment and access control phase). The enrolment station E (and later the desktop D) acts as a master in the communication with the biometric server S and with the biometric scanner B. The biometric scanner B answers to queries in a unique way, so there in no difference between access control and enrollment for the biometric scanner B.

Biometric Algorithms

The raw image from the scanner is first cleaned up in the biometric scanner B using an image pre-processing algorithm; this pre-processing may comprise illumination and contrast correction, noise reduction, background elimination, cropping, adjustment of the orientation, etc. Finally, the biometric features are extracted. The final feature extraction delivers a black-and-white image which is stored in the database $DB_1$ or matched with a record in this database. Each record stores several images, for example three.

Matching algorithm. The biometric matching algorithm compares the test image delivered during access control with one or a plurality of reference images (Templates) stored during enrolment.

Given two images, the biometric matching algorithm returns a score, for example a score between 0 and 0.5.

Score algorithms with aggregation. Since the fingervein biometric sensor delivers several images, we obtain several scores that need to be aggregated.

According to one aspect, the following method steps are preferably used for this aggregation.

After m iterations (m scan of the finger of one user U), we have a list hist=(score$_1$, ..., score$_m$) where each score; is a triplet of numbers in the example with three images. Hence, hist=(s$_1$, ..., s$_n$) with n=3m. We model the s$_i$ by independent random variables. If the test images and the reference images all correspond to the same finger, we assume that every s$_i$ follows one distribution same$_c$, depending on the used camera c (left, center, or right in the example with three cameras) to scan the templates. If they correspond to different fingers, we assume that every s$_i$ follows one distribution diff$_c$.

We design a sequential distinguisher such that given hist, the output is either "same", or "diff", or ⊥, meaning that no decision is reached, hence more samples are needed. We define the false acceptance rate FAR=Pr$_{diff}$ [output=same], and the false rejection rate FRR=Pr$_{same}$[output=diff]. An aim is to make a distinguisher reaching a target FAR$_{target}$ and FRR$_{target}$, and requiring as few samples as possible.

To solve this problem, we use the theory of sequential distinguishers previously used in block cipher cryptanalysis. A complete description of this theory can be found in Pascal Junod, "On the optimality of linear, differential, and sequential distinguishers", In Eli Biham, editor, Advances in Cryptology, EUROCRYPT 2003, International Conference on the Theory and Applications of Cryptographic Techniques, Warsaw, Poland, May 4-8, 2003, Proceedings, volume 2656 of Lecture Notes in Computer Science, pages 17-32. Springer, 2003.

Given a tuple of m scores (score$_1$, ..., score$_m$), we compute the likelihood ratio $$lr = \frac{Pr_{same}[score_1, \ldots, score_m]}{Pr_{diff}[score_1, \ldots, score_m]}$$

The best sequential distinguisher accepts the hypothesis that the scores comes from same if lr≥τ$_+$, for some parameter τ$_+$. It accepts the hypothesis that the score comes from diff if lr≤τ$_-$, for some parameter τ$_-$. In between, the distinguisher waits for more samples. Using the Wald approximation, if we want to obtain $FAR_{target}$ and $FRR_{target}$, we should use $\tau_+ \approx 1/FAR_{target}$ and $\tau_- \approx FRR_{target}$.

We make the approximation that the scores are normally distributed, which is well supported by experiment. We let ci be the camera used to compute $s_i$. Hence, ln lr can be computed by summing all $$\ln \frac{Pr_{same}[s_i]}{Pr_{diff}[s_i]} = \Delta lpdf_{c_i}(s_i)$$

Using the probability density function of the normal distribution, we obtain $$\Delta lpdf_c(s) = \frac{(s - \mu_c^{diff})^2}{2(\sigma_c^{diff})^2} - \frac{(s - \mu_c^{same})^2}{2(\sigma_c^{same})^2} + \ln \frac{\sigma_c^{diff}}{\sigma_c^{same}}$$

The expected value of ln lr with same distribution is $$E_{same}(\ln lr) = \sum_i \left( \frac{(\sigma_{c_i}^{same})^2}{2(\sigma_{c_i}^{diff})^2} + \frac{(\mu_{c_i}^{same} - \mu_{c_i}^{diff})^2}{2(\sigma_{c_i}^{diff})^2} - \frac{1}{2} + \ln \frac{\sigma_{c_i}^{diff}}{\sigma_{c_i}^{same}} \right) + \ln$$

Given that we have m iterations for each camera c, we deduce that the complexity to reach a good decision with same is approximately $$m_{same} \approx \frac{\ln \tau_+}{\sum_c \left( \frac{(\sigma_c^{same})^2}{2(\sigma_c^{diff})^2} + \frac{(\mu_c^{same} - \mu_c^{diff})^2}{2(\sigma_c^{diff})^2} - \frac{1}{2} + \ln \frac{\sigma_c^{diff}}{\sigma_c^{same}} \right)}$$

If we have scores coming from three cameras, we have the following experimental parameters

| same | left | center | right |
|---|---|---|---|
| μ | 0.141 | 0.148 | 0.151 |
| σ | 0.037 | 0.032 | 0.043 |

| diff | left | center | right |
|---|---|---|---|
| μ | 0.112 | 0.111 | 0.129 |
| σ | 0.020 | 0.014 | 0.026 |

This method has one limitation though: it assumes a bad distribution coming from taking the biometric features of two random different persons. If an adversary tries another distribution of pictures (like a totally white picture), he may have better chances than what our analysis shows. It is typically a problem when the score is very low. For very low scores, the same distribution becomes more likely than the diff one. We let $\mu_\tau$ be the lower crossing point on the two probability density functions. We decide to skip score$_j$ whenever $(score_j)_{center} < \mu_\tau$. It does not deny access. It only declares this capture unusable. Hence, its effect is to divide $m_{same}$ by $Pr_{same}[\mu > \mu_\tau]$. In our case, $\mu_\tau = 0.0739$ and this increases $m_{same}$ by only 1.04%.

Security Analysis

The security model assumes that the adversary has full control on the network and can make participants launch protocols with adversarially chosen inputs. Desktops D, scanner B, the server S, and enrollment desktop E are supposed to be honest. The D< >L link is assumed to be secure and out of the scope of this security analysis. That is, in our security games, the adversary plays with every D, E, B, S with chosen input and sits in the middle of communication between them. He can also require a chosen user to have his finger scanned on a chosen B.

We assume that PKC is INDCCA-secure, DSS is EFCMA-secure, AEAD is indistinguishable from an ideal primitive against chosen plaintext and ciphertext attacks, and H is collision-resistant. It can be proven that:

(enrollment) if E says that pseudo was successfully enrolled with B, it must be the case that S did so, and if S enrolls pseudo from B, it must be because E asked for it and B followed (however, E may fail before announcing a success);

(AC) if D granted access to pseudo from B, it is certainly the case that its policy in $DB_1$ validated a sequence of captures from B;

(privacy of templates) the adversary cannot extract information about the biometric templates taken from B, even if E is malicious;

(privacy of pseudo) a semi-passive adversary cannot distinguish the pseudo of a user from a random one (however, an active adversary could simulate D and test a pseudo for a user).

Possible Implementation

The proposed method can rely on any user authentication framework in a network.

For PKC, we may use 2048-bits RSA-OAEP and AES-GCM depending on the message length. AES-GCM is implemented with 128-bit key size, 128-bit Mac/Tag size, and 128-bit IV/Nonce. The additional data is either empty, 6 bytes or a hash. For hash, we may use SHA256. For DSS, we may use 2048-bits RSA-PSS.

Depending on the embodiment, certain acts, events, or functions of any of the algorithms described herein can be performed in a different sequence, can be added, merged, or left out altogether (for example, not all described acts or events are necessary for the practice of the methods). Moreover, in certain embodiments, acts or events can be performed concurrently, for instance, through multi-threaded processing, interrupt processing, or multiple processors or processor cores or on other parallel architectures, rather than sequentially. In addition, different tasks or processes can be performed by different machines or computing systems that can function together.

The various illustrative logical blocks, modules, and algorithm steps described herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, a microprocessor, a state machine, a digital signal processor (DSP), an application specific integrated circuit (ASIC), a FPGA, or other programmable logic device, discrete gate or transistor logic, discrete hardware components, or any combination thereof designed to perform the functions described herein. A hardware processor can include electrical circuitry or digital logic circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. A computing environment can include any type of computer system, including, but not limited to, a computer system based on a microprocessor, a mainframe computer, a digital signal processor, a portable computing device, a device controller, or a computational engine within an appliance, to name a few.

"Servers", such as the organization server or the biometric server, can be implemented or performed by a physical machine, a virtual server, a general-purpose computer, multiple servers, cloud based computational resources, or other programmable components or modules providing the services and methods described.

Unless described otherwise, the links and connections between servers, machines, devices or modules can be provided by any protocol, including USB, Ethernet, Bluetooth, etc.

The steps of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage. An example storage medium can be coupled to the processor such that the processor can read information from, and write information to, the storage medium. In the alternative, the storage medium can be integral to the processor. The storage medium can be volatile or nonvolatile.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements or states. Thus, such conditional language is not generally intended to imply that features, elements or states are in any way required for one or more embodiments or that one or more embodiments necessarily include logic for deciding, with or without author input or prompting, whether these features, elements or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

The invention claimed is:

1. A method for controlling access of users to desktops in an organization, comprising the steps of:
   1. a user requests access to a desktop;
   2. an organization server verifies if the user is authorized to access the desktop, and returns a pseudo of the user;
   3. the user scans a pattern of fingerveins of one finger with a biometric scanner comprising a plurality of cameras at different angles around the finger, resulting in a plurality of images of said pattern;
   4. a file corresponding to said images is encrypted by said biometric scanner with a public key of a biometric server, and signed with a private key of said biometric scanner, and sent to the desktop;
   5. the desktop forwards said encrypted and signed file to said biometric server;
   6. the biometric server decrypts the received file with its private key, verifies the signature of the biometric scanner, and matches the received images with reference images associated with said pseudo;
   7. the biometric server decides based on the result of this match if the recognition succeeded, failed, or if an additional scan of the user's finger is needed.

2. The method of claim 1, wherein said images are only accessible to the biometric scanner and to the biometric server.

3. The method of claim 1, wherein the user claims an identity and wherein the claimed identity of the user is only accessible to the desktop and to the organization server.

4. The method of claim 1, wherein the biometric server compares images of said finger from different angles with reference images of the same finger corresponding to said pseudo, and delivers several matching scores which are aggregated before a decision to grant or refuse access is taken.

5. The method of claim 1, wherein the steps 3-7 are iteratively repeated until a predefined false acceptance rate and/or false rejection rate is achieved.

6. The method of claim 5, wherein a number of iterations that is needed is approximated based on a method of sequential distinguishers.

7. A control access system for controlling access of users to desktops in an organization, comprising:
   1. a plurality of desktops in which a user can request an access;
   2. an organization server arranged for verifying if the user is authorized to access a desktop of the plurality of desktops, and for returning a pseudo of the user;
   3. a biometric server distinct from said organization server;
   4. a biometric scanner arranged for letting the user scan a pattern of fingerveins of one finger, said biometric scanner comprising a plurality of cameras at different angles around the finger, resulting in a plurality of images of said pattern, said biometric scanner further comprising a processing system arranged for encrypting a file corresponding to said images with a public key of said biometric server, for signing said file with a private key of said biometric scanner, and for sending the encrypted and signed file to one said desktop;
   5. one of said desktops being further arranged for forwarding said encrypted and signed file to said biometric server;
   6. said biometric server being further arranged for decrypting the received file with its private key, for verifying the signature of the biometric scanner, and for matching the received images in said file with reference images associated with said pseudo;

7. the biometric server being further arranged for deciding based on the result of this match if the recognition succeeded, failed, or if an additional scan is needed.

8. The system of claim 7, wherein said images are only accessible to the biometric scanner and to the biometric server.

9. The system of claim 7, wherein said user claims an identity and wherein the claimed identity of the user is only accessible to the desktop and to the organization server.

10. The system of claim 7, wherein the biometric server is arranged for comparing images of said finger from different angles with reference images from same angles of a finger associated with said pseudo, and for delivering several matching scores which are aggregated before a decision to grant or refuse access is taken.

11. The system of claim 7, wherein the biometric server is further arranged for iteratively repeating a scan of said fingerveins until a predefined false acceptance rate and/or false rejection rate is achieved.

12. A biometric server comprising a memory device and a hardware processor configured to execute instructions from the memory, said biometric server arranged for receiving a file, for decrypting the received file with a private key, for verifying a signature of the file, and for matching received images in said file with reference images of a user identified by a pseudo;

the biometric server being further arranged for deciding based on the result of this match if the recognition succeeded or failed based on a first scan of a pattern of fingerveins of one finger, or if further scans of the pattern of fingerveins are needed.

13. The biometric server of claim 12, wherein the biometric server is further arranged for comparing images of said finger from different angles with reference images from same angles of a finger associated with said pseudo, and for delivering several matching scores which are aggregated before a decision to grant or refuse access is taken.

14. The biometric server of claim 13, further arranged for iteratively repeating a scan of a fingervein until a predefined false acceptance rate and/or false rejection rate is achieved.

* * * * *